United States Patent
McKenney (10) Patent No.: US 7,395,263 B2
(45) Date of Patent: Jul. 1, 2008

(54) REALTIME-SAFE READ COPY UPDATE WITH LOCK-FREE READERS

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/248,096

(22) Filed: Oct. 12, 2005

(65) Prior Publication Data

US 2007/0083565 A1    Apr. 12, 2007

(51) Int. Cl.
G06F 7/00        (2006.01)
G06F 17/30       (2006.01)
G06F 12/00       (2006.01)

(52) U.S. Cl. .............................. 707/8; 707/3; 707/201; 707/203

(58) Field of Classification Search ............. 707/8, 707/100, 101; 718/100
See application file for complete search history.

(56) References Cited

U.S. PATENT DOCUMENTS

| | | | |
|---|---|---|---|
| 5,442,758 A | 8/1995 | Slingwine et al. | 707/8 |
| 5,608,893 A | 3/1997 | Slingwine et al. | 711/141 |
| 5,727,209 A | 3/1998 | Slingwine et al. | 718/102 |
| 6,182,107 B1* | 1/2001 | Atsatt | 718/100 |
| 6,219,690 B1 | 4/2001 | Slingwine et al. | 718/102 |
| 6,360,220 B1* | 3/2002 | Forin | 707/8 |
| 6,581,063 B1* | 6/2003 | Kirkman | 707/100 |
| 6,615,216 B1* | 9/2003 | Hu | 707/101 |
| 6,668,310 B2 | 12/2003 | McKenney | 711/147 |
| 6,760,726 B1* | 7/2004 | Hersh | 707/8 |
| 6,785,888 B1 | 8/2004 | McKenney et al. | 718/104 |
| 7,287,135 B2* | 10/2007 | McKenney et al. | 711/159 |
| 7,349,926 B2* | 3/2008 | McKenney et al. | 707/200 |

(Continued)

OTHER PUBLICATIONS

J. Seigh, "RCU+SMR for preemptive kernel/user threads," Linux Kernel Mailing List, May 9, 2005, 2 pages.

(Continued)

*Primary Examiner*—Mohammad Ali
*Assistant Examiner*—Brannon W Smith
(74) *Attorney, Agent, or Firm*—Walter W. Duft; Abdy Raissinia (57) ABSTRACT

A technique for realtime-safe detection of a grace period for deferring the destruction of a shared data element until preexisting references to the data element have been removed. A pair of counters is established for each of one or more processors. A global counter selector determines which counter of each per-processor counter pair is a current counter. When reading a shared data element at a processor, the processor's current counter is incremented. Following counter incrementation, the processor's counter pair is tested for reversal to ensure that the incremented counter is still the current counter. If a counter reversal has occurred, such that the incremented counter is no longer current, the processor's other counter is incremented. Following referencing of the shared data element, any counter that remains incremented is decremented. Following an update to the shared data element wherein a pre-update version of the element is maintained, the global counter selector is switched to establish a new current counter of each per-processor counter pair. The non-current counter of each per-processor counter pair is tested for zero. The shared data element's pre-update version is destroyed upon the non-current counter of each per-processor counter pair being zero.

6 Claims, 12 Drawing Sheets

U.S. PATENT DOCUMENTS 7,353,346 B2 * 4/2008 McKenney et al. ......... 711/154

OTHER PUBLICATIONS

M. Michael, "Hazard Pointers: Safe Memory Reclamation for Lock-Free Objects," IEEE Transactions On Parallel And Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

Ben Gamsa et al., "Tornado: Maximizing Locality and Concurrency in a Shared Memory Multiprocessor Operating System" 1999.

* cited by examiner

REALTIME-SAFE READ COPY UPDATE WITH LOCK-FREE READERS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
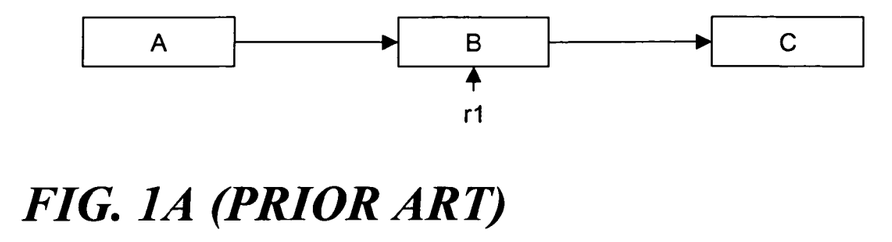
FIGS. 1A-1D are diagrammatic representations of a linked list of data elements undergoing a data element replacement according to a conventional read-copy update mechanism.
Figure 1B:
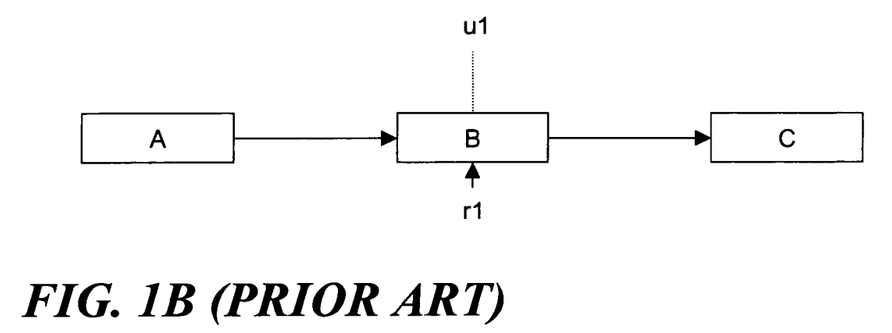
Figure 1C:
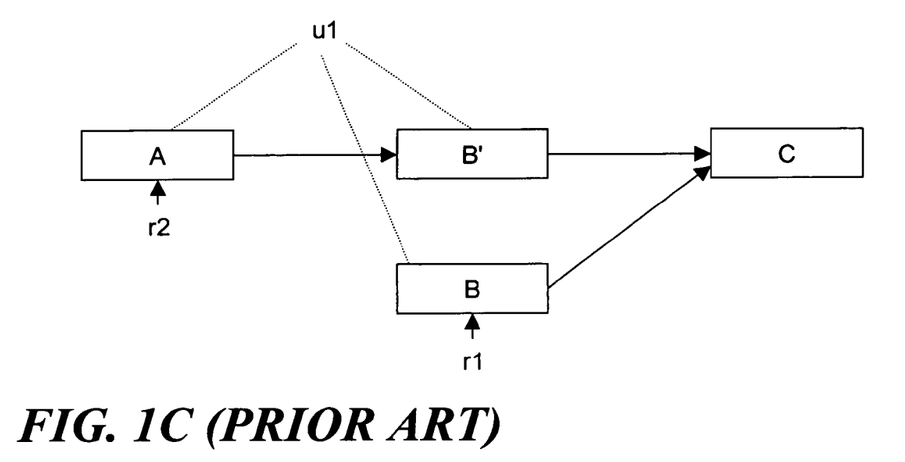

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
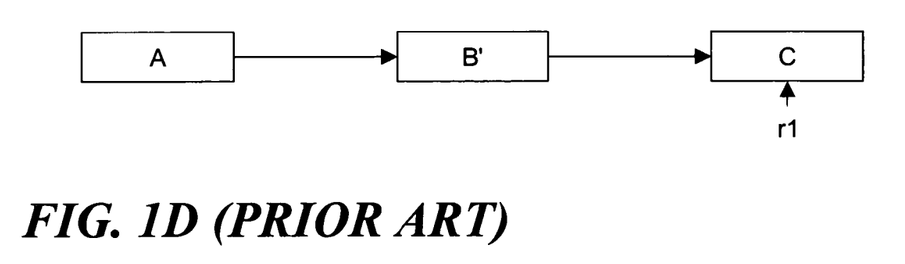

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
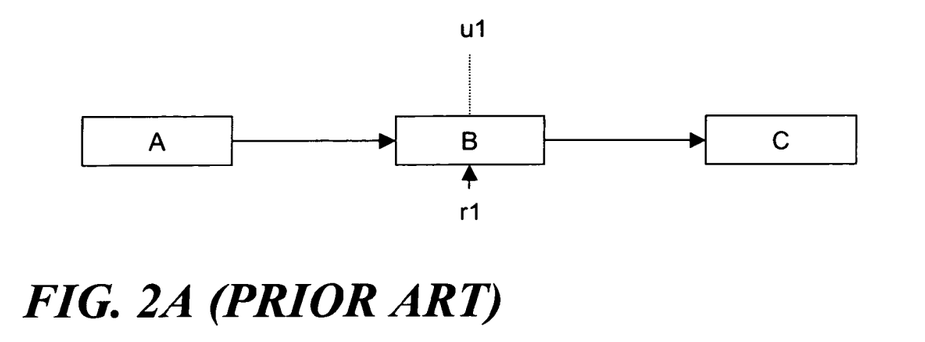
FIGS. 2A-2C are diagrammatic representations of a linked list of data elements undergoing a data element deletion according to a conventional read-copy update mechanism.
Figure 2B:
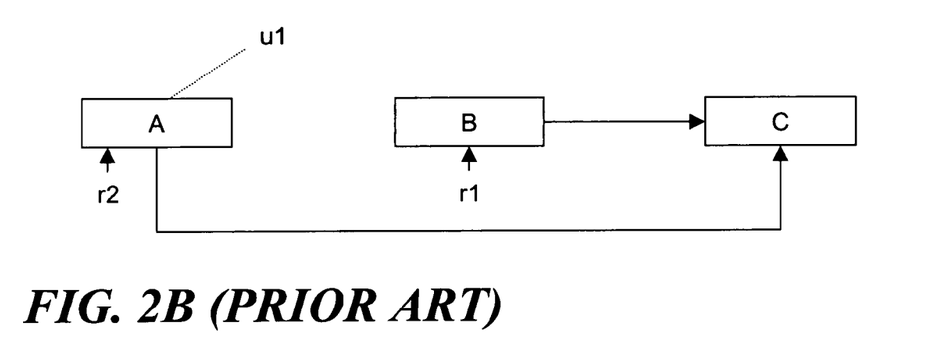
Figure 2C:
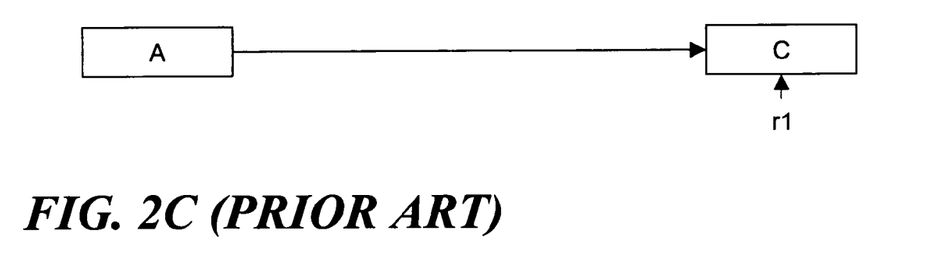

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
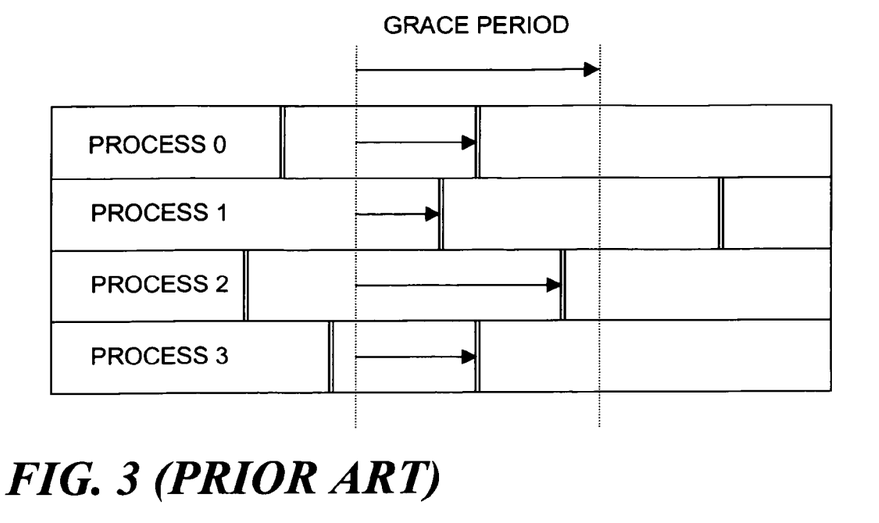
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring."

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a "callback") with a read-copy update subsystem so that it can be executed at the end of the grace period. The read-copy update subsystem keeps track of pending callbacks for each processor and monitors per-processor quiescent state activity in order to detect when each processor's current grace period has expired. As each grace period expires, all scheduled callbacks that are ripe for processing are executed.

Conventional grace period processing faces challenges in a preemptive realtime computing environment because a context switch does not always guarantee that a grace period will have expired. In a preemptive realtime computing system, a reader holding a data reference can be preempted by a higher priority process. Such preemption represents a context switch, but can occur without the usual housekeeping associated with a non-preemptive context switch, such as allowing the existing process to exit a critical section and remove references to shared data. It therefore cannot be assumed that a referenced data object is safe to remove merely because all readers have passed through a context switch. If a reader has been preempted by a higher priority process, the reader may still be in a critical section and require that previously-obtained data references be valid when processor control is returned.

It is to solving the foregoing problems that the present invention is directed. In particular, what is required is a read-copy update grace period detection technique that may be safely used in a preemptive realtime computing environment.

SUMMARY OF THE INVENTION

The foregoing problems are solved and an advance in the art is obtained by a method, system and computer program product for implementing realtime-safe detection of a grace period for deferring the destruction of a shared data element until pre-existing references to the data element are removed. According to the inventive technique, a pair of counters is established for each of one or more processors. A global counter selector determines which counter of each per-processor counter pair is a current counter. When reading a shared data element at a processor, the current counter of the processor's counter pair that corresponds to the global counter selector is incremented. The processor's counter pair is tested for reversal to ensure that the incremented counter is still the current counter corresponding to the global counter selector. If a counter pair reversal has occurred, such that the incremented counter has become the non-current counter, the other counter of the processor's counter pair that has become the current counter is incremented. After the shared data element has been referenced, each counter of the processor's counter pair that remains incremented is decremented. Following an update to the shared data element wherein a pre-update version of the shared data element is maintained, the global counter selector is switched to establish a new current counter of each per-processor counter pair. The non-current counter of each per-processor counter pair is tested for zero. The shared data element's pre-update version is destroyed (e.g., freed) upon the non-current counter of each per-processor counter pair being zero.

In one exemplary embodiment of the invention, both counters of the processor's counter pair are incremented in the event that a counter pair reversal has occurred. The counters remain incremented until referencing of the shared data element has completed. In another exemplary embodiment of the invention, the non-current counter of the processor's counter pair is decremented in the event that a counter pair reversal has occurred.

Decrementing of the non-current counter occurs prior to referencing of the shared data element. In accordance with another exemplary embodiment of the invention, counter incrementation is bypassed in the event that the reading of a shared data element is a recursive read operation.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 4:
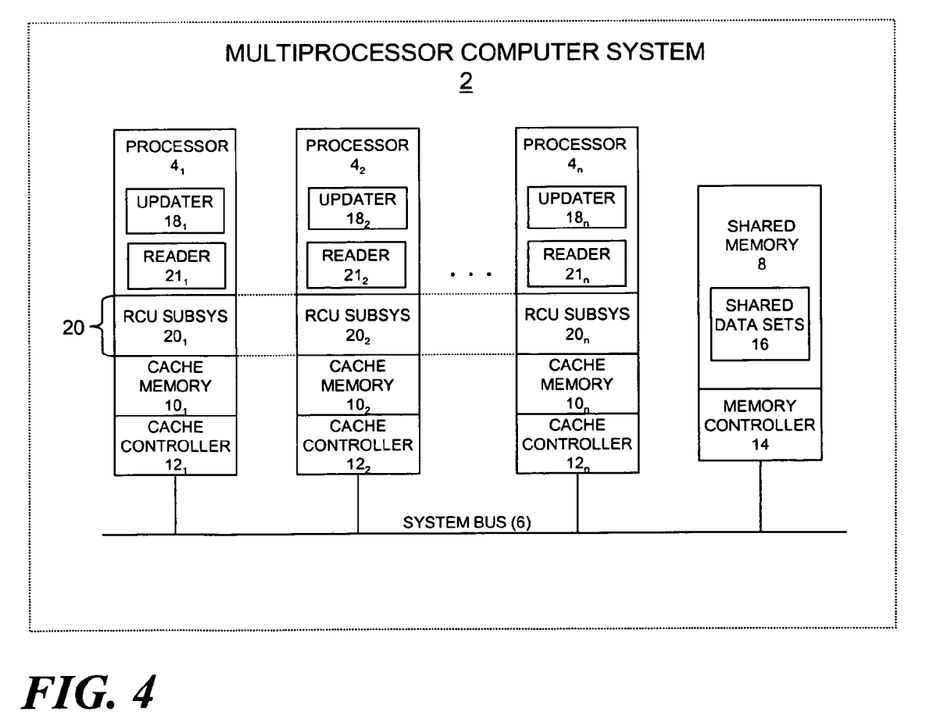
FIG. 4 is a functional block diagram showing a multiprocessor computing system that represents an exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment. In the alternative, a single processor computing environment could be used to implement the invention.

It is further assumed that update operations executed within kernel or user mode processes, threads, or other execution contexts will periodically perform updates on a set of shared data 16 stored in the shared memory 8. Reference numerals $18_1, 18_2 \ldots 18_n$ illustrate individual data update operations (updaters) that may periodically execute on the several processors $4_1, 4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. To facilitate such updates, the several processors $4_1, 4_2 \ldots 4_n$ are programmed to implement a read-copy update (RCU) subsystem 20, as by periodically executing respective RCU instances $20_1, 20_2 \ldots 20_n$ as part of their operating system functions. Each of the processors $4_1, 4_2 \ldots 4_n$ also periodically execute read operations (readers) $21_1, 21_2 \ldots 21_n$ on the shared data 16. Such read operations will typically be performed far more often than updates, insofar as this is one of the premises underlying the use of read-copy update.

Figure 5:
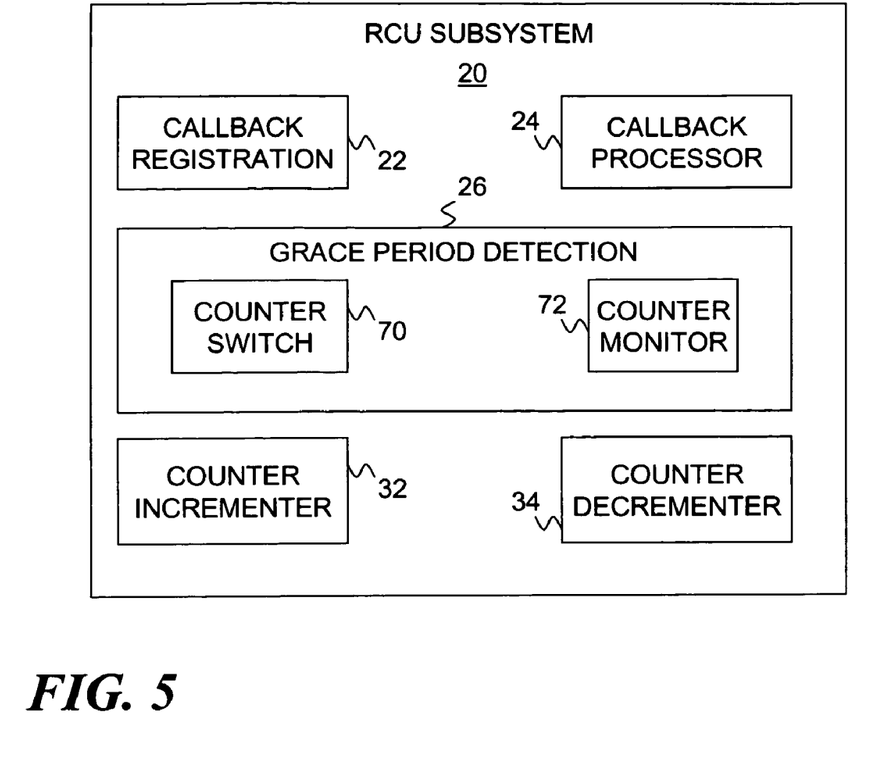
FIG. 5 is a functional block diagram showing a read-copy update subsystem implemented by each processor in the multiprocessor computer system of FIG. 4.

As shown in FIG. 5, the RCU subsystem 20 includes a callback registration component 22. The callback registration component 22 serves as an API (Application Program Interface) to the RCU subsystem 20 that can be called by the updaters $18_2 \ldots 18_n$ to register requests for deferred (second phase) data element updates following initial (first phase) updates performed by the updaters themselves. As is known in the art, these deferred update requests involve the destruction of stale data elements, and will be handled as callbacks within the RCU subsystem 20. A callback processing system 24 within the RCU subsystem 20 is responsible for executing the callbacks, then removing the callbacks as they are processed. A grace period detection system 26 determines when a grace period has expired so that the callback processing system 24 can execute the callbacks. All callbacks that are registered during a given grace period can be batched (e.g., on callback queues). When a new grace period starts, the accumulated callbacks associated with the preceding grace period may be safely processed without affecting the readers $21_1, 21_2 \ldots 21_n$. The callbacks being accumulated during the current grace period can likewise be safely processed during the next grace period, and so on.

In non-realtime computing environments, grace period detection can be conventionally based on each of the processors $4_1, 4_2 \ldots 4_n$ passing through a quiescent state that typically arises from a context switch. However, as described by way of background above, if the processors $4_1, 4_2 \ldots 4_n$ are programmed to run a preemptable realtime operating system, an executing task, such as any of the readers $21_1, 21_2 \ldots 21_n$, can be preempted by a higher priority task. Such preemption can occur even while the readers $21_1, 21_2 \ldots 21_n$ are in a critical section referencing elements of the shared data 16 (shared data elements). In order to prevent premature grace period detection and callback processing, a technique is needed whereby the readers $21_1, 21_2 \ldots 21_n$ can advise the RCU subsystem 20 that they are performing critical section processing. Although one solution would be to suppress preemption across read-side critical sections, this approach can degrade realtime response latency. Another technique that does not require critical section preemption suppression is to assign a counter to each processor $4_1, 4_2 \ldots 4_n$, that the readers $21_1, 21_2 \ldots 21_n$ can increment when accessing the shared data 16, then decrement when such processing has completed. The RCU subsystem 20 would not perform callback processing on callbacks that accumulate while the counters are being manipulated until all counters are zero. A deficiency of this approach is that it is subject to long grace periods due to the counters being repeatedly incremented by multiple readers, some of which may undergo preemption before they can decrement their counter. It also preferable to be able to force a grace period, particularly under low-memory conditions, so that callbacks can be processed and memory freed. The single counter approach does not permit grace periods to be forced.

Figure 6:
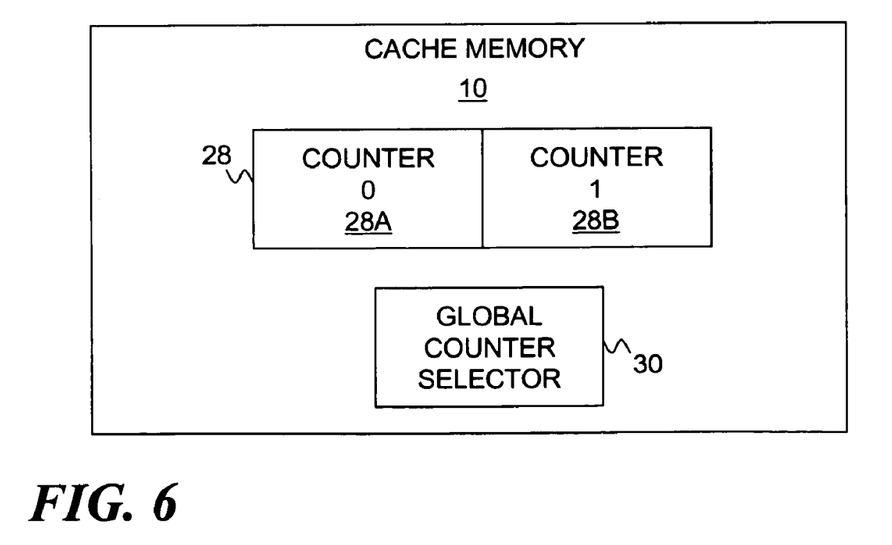
FIG. 6 is a functional block diagram showing a cache memory associated with each processor of the multiprocessor computer system of FIG. 4.

As shown in FIG. 6, an alternative approach is to assign a pair 28 of counters 28A and 28B to each of the processors $4_1, 4_2 \ldots 4_n$, and to further provide a global counter selector 30.

The cache controllers $12_1, 12_2 \ldots 12_n$ will conventionally maintain a copy of each processor's counters 28A/28B in that processor's associated cache memory $10_1, 10_2 \ldots 10_n$. The value of the global counter selector 30 will typically also be cached locally in each cache memory $10_1, 10_2 \ldots 10_n$. The global counter selector 30 can be implemented as a Boolean variable whose value (0 or 1) selects which set of the counter 28A or 28B will serve as a current counter set and which will serve as a non-current counter set, for grace period detection. Each grace period and its associated callbacks will be controlled by one set of the counters 28A or 28B. In particular, as described in more detail below, during one grace period, a selected set of the counters 28A or 28B (determined by the global counter selector 30) will be manipulated (incremented/decremented) by the readers $21_1, 21_2 \ldots 21_n$ as they perform critical section processing. New callbacks that are registered while the selected set of counters is being manipulated will be batched. When it is desired to start a new grace period, the counters will be "flipped." Whichever set of counters 28A or 28B was not being manipulated now becomes the new counter set. Readers $21_1, 21_2 \ldots 21_n$ that enter a critical section after this point will manipulate the new set of counters 28A or 28B and a new batch of callbacks will be accumulated for the new grace period. Meanwhile, the old set of counters 28A or 28B associated with the last grace period is monitored to determine when all of the old counters have reached zero. This signifies that the old batch of callbacks associated with the last grace period can be safely processed because the readers $21_1, 21_2 \ldots 21_n$ that were manipulating the old counters have exited their critical sections. To start yet another grace period, the counters are again flipped (by inverting the global counter selector 30), and the process repeats.

The RCU subsystem 20 is provided with two routines that the readers $21_1, 21_2 \ldots 21_n$ can invoke in order to manipulate the counters 28A/28B during read operations. As shown in FIG. 5, one such routine is a counter incrementer 32 that is responsible for incrementing one or both of a processor's counters 28A/28B prior to one of the readers $21_1, 21_2 \ldots 21_n$ referencing a shared data element. The other routine is a counter decrementer 34 that is responsible for decrementing one or both of a processor's counters 28A/28B after one of the readers $21_1, 21_2 \ldots 21_n$ has completed its read operations.

Figure 7A:
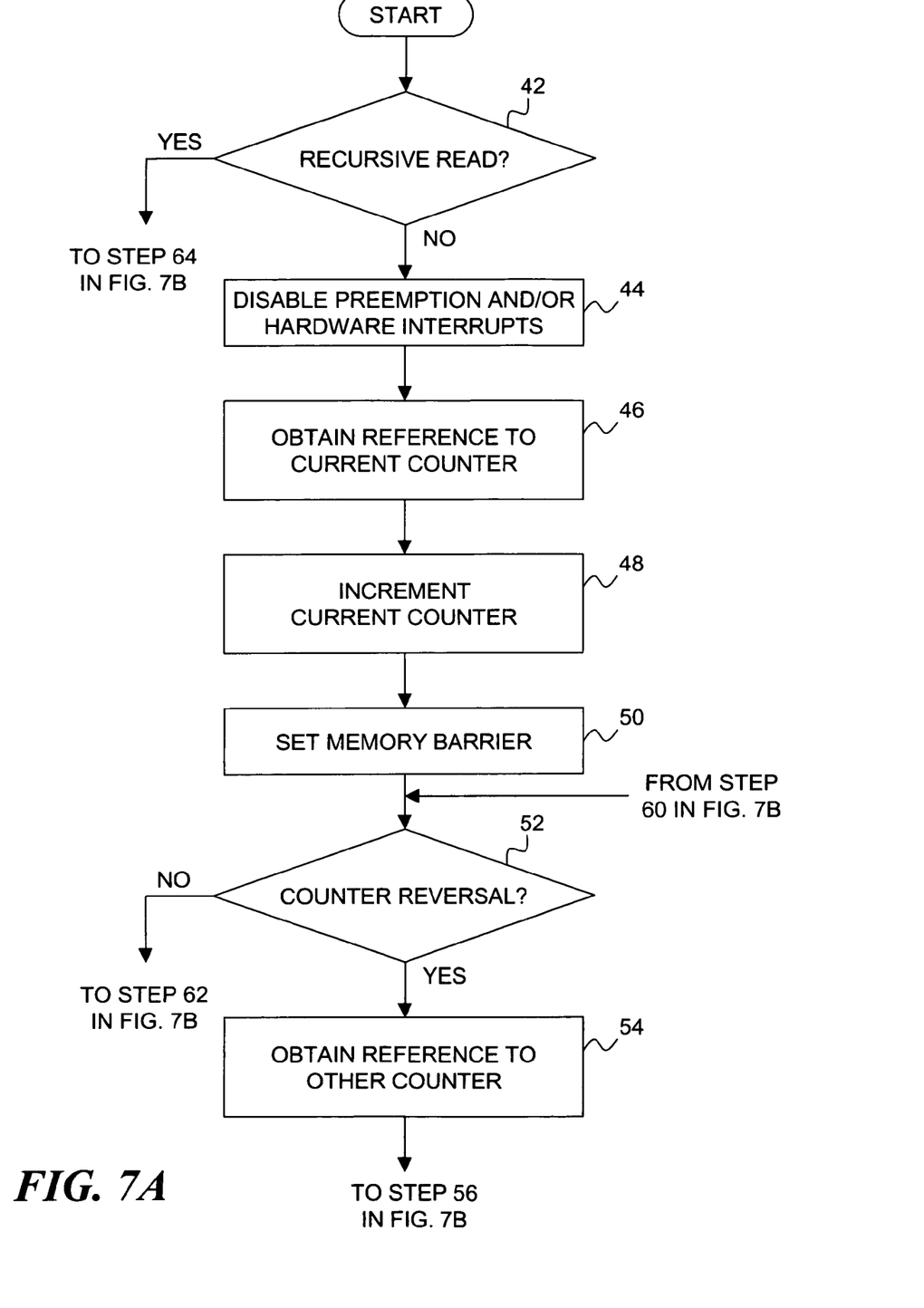
FIGS. 7A and 7B are parts of a flow diagram showing read processing that may be performed.
Figure 7B:
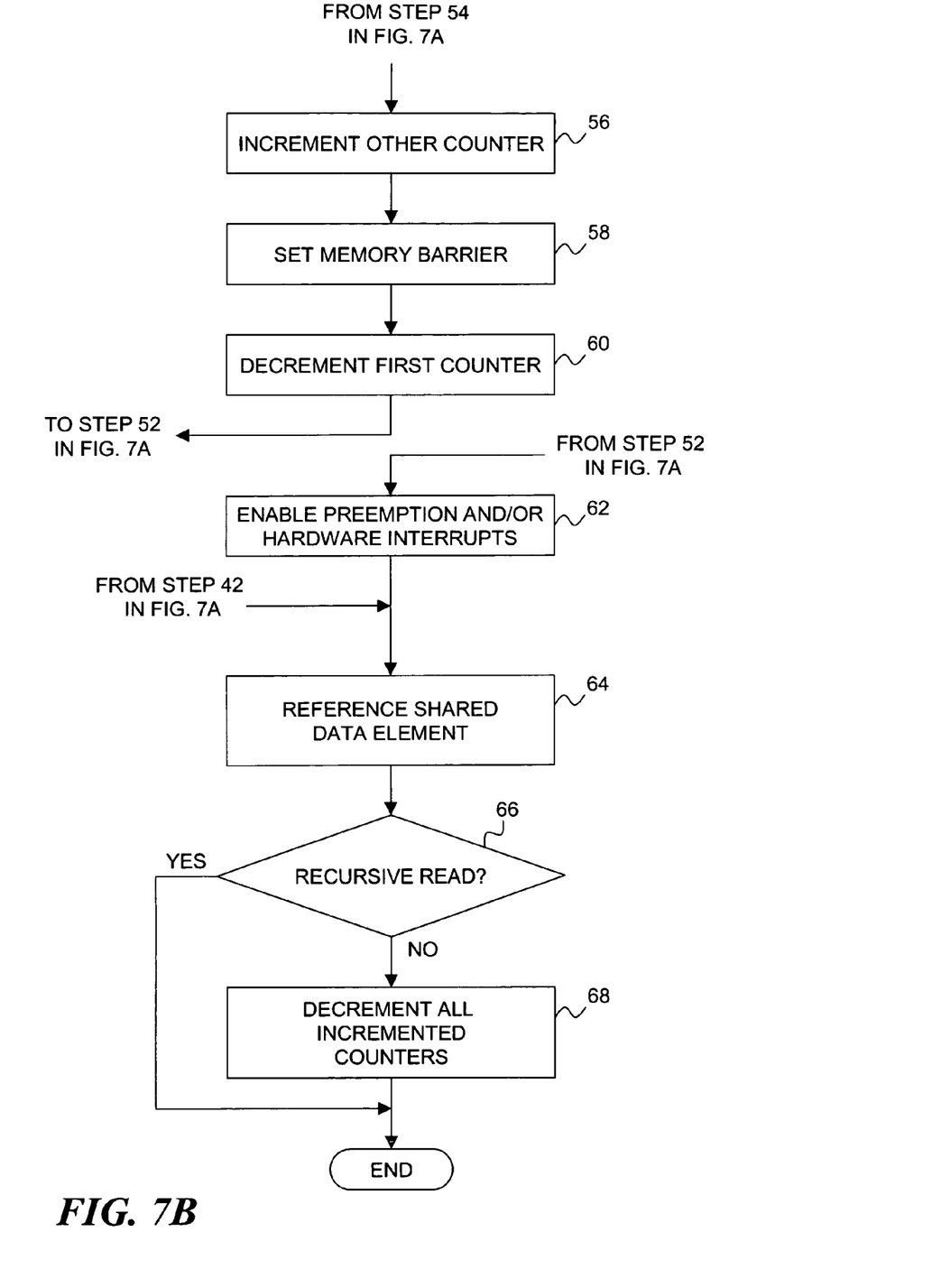

The reader 21, the counter incrementer 34 and the counter decrementer 36 may operate together in accordance with the flow diagram of FIGS. 7A-7B. When the reader 21 first invokes the counter incrementer 32, the latter implements step 42 to test whether or not the current read operation is recursive. By way of example, a recursive read operation can arise when nested data structures are accessed (e.g., an RCU-protected list pointed to by another RCU-protected list). Another scenario is when an interrupt occurs while a process is performing a read operation on RCU-protected data, and the interrupt service routine also performs a read operation on RCU-protected data. When such recursion occurs, it is not necessary to manipulate the counters 28A/28B insofar as the read operations are nested and counter manipulation by the outermost read operation will necessarily prevent premature callback processing for both itself and the recursive read operations.

If the current read operation is determined in step 42 to be recursive, no counter manipulation is required. Control is returned to the reader 21 and it performs its read processing operations in step 64. If the current read operation is not recursive, processing proceeds to step 44 and the counter incrementer 32 disables preemption and/or hardware interrupts to prevent preemption and/or reentrant OS-level interrupt processing during counter manipulation, which is relatively brief. In step 46, the counter incrementer 32 obtains a reference to the current counter of the counter pair 28 that is associated with the processor 4 on which the reader 21 is executing. The current counter is the one identified by the current value of the global counter selector 30. For purposes of the present discussion, the current counter is assumed to be the counter 28A. In step 48, the incrementer 32 increments the current counter 28A.

At this point, control could be returned to the reader 21 so that it could begin read processing in accordance with step 64. However, as described in more detail below, the status of the counters 28A/28B is periodically switched by the grace period detection system 26 as it manipulates the global counter selector 30 during grace period processing operations. It is possible for a race condition to exist between the incrementer 32 manipulating the counter 28A and the RCU subsystem 20 changing the global counter selector 30. This race condition could manifest itself in the counter 28A being referenced in step 46 by the counter incrementer 32, but then designated as the non-current counter by the grace period detection system 26 prior to incrementation in step 48. Due to the manner in which the grace period detection system 26 performs grace period processing (see below), this could result in the incrementation of the counter 28A being rendered ineffective, providing no protection against premature callback processing.

Accordingly, following incrementation of the current counter 28A in step 48, the counter incrementer 32 executes a memory barrier instruction in step 50 to force completion of the counter incrementation. The counter incrementer 32 then enters a loop at step 52 based on whether a counter reversal has occurred. If the counters 28A/28B have been switched, such that the incremented counter 28A is no longer current and the other counter 28B is now current, the counter incrementer 32 obtains a reference to this counter in step 54. The counter incrementer 32 then increments the counter 28B in step 56 and executes a memory barrier instruction in step 58. In step 60 the counter incrementer 32 decrements the original counter 28A to return it to its original state. Processing then loops back to step 52 to check for another counter reversal. If at any time step 52 determines that no counter reversal has occurred, step 62 is invoked and the counter incrementer 32 re-enables preemption and returns control to the reader 21. In step 64, the reader 21 references an element of the shared data 16 in conventional fashion. When reading of the shared data is complete, the readers 21 invokes the counter decrementer 34. The counter decrementer 34 tests in step 66 whether the current read operation is recursive. A memory barrier instruction can be executed to ensure that this test is implemented prior to the next step. If it is determined in step 66 that the current read operation is recursive, control is returned to the reader 21. If the current read operation is not recursive, step 68 is performed and the counter decrementer 40 decrements whichever counter 28A/28B was incremented by the counter incrementer 32. Control is then returned to the reader 21.

As previously stated, the RCU subsystem 20 of FIG. 5 uses the per-processor counters 28A/28B to determine when it is safe to invoke the callback processor 26 to process the callbacks that were registered during a grace period. More particularly, the grace period detection system 26 includes a counter switch 70 that manipulates the global counter selector 30 and a counter monitor 72 that monitors whichever set of the counters 28A or 28B is the non-current counter set (i.e., the counter set associated with the last grace period) to determine when the callbacks associated with that grace period may be processed. As described above, each grace period and the callbacks that were registered during that grace period will be associated with one set of the counters 28A or 28B. When all counters in the counter set associated with a grace period are zero, the callbacks for that grace period may be safely processed.

Figure 8:
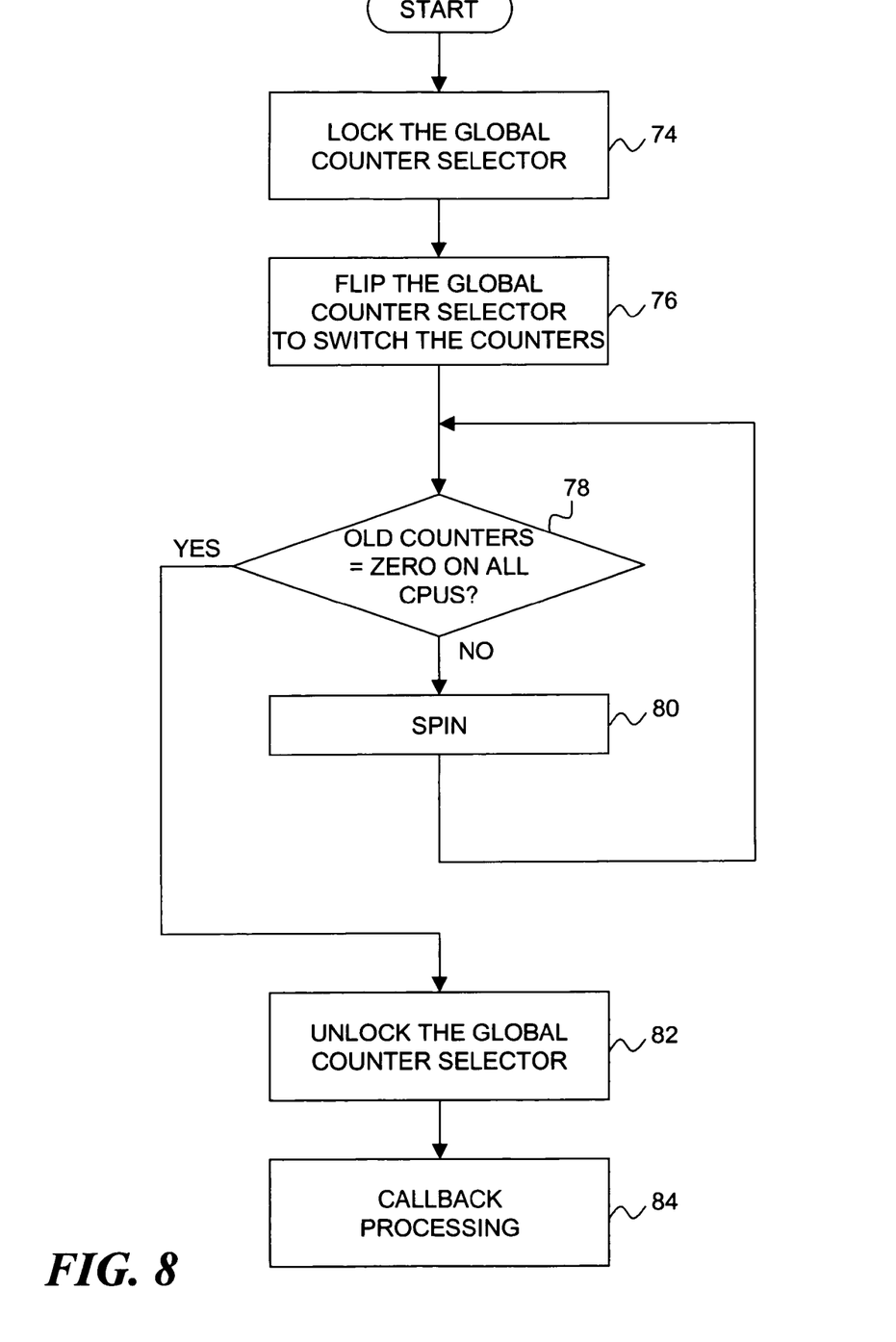
FIG. 8 is a flow diagram showing grace period detection processing that may be performed by the read-copy update subsystem of FIG. 5.

FIG. 8 illustrates exemplary processing steps that may be performed by the counter switch 70 and the counter monitor 72 to implement realtime-safe grace period detection in a manner that prevents prolonged grace periods while avoiding premature callback processing. Beginning in step 74, the counter switch 70 sets a lock on the global counter selector 30. In step 76, the counter switch 70 flips the global counter selector 30 to switch the status of the counters 28A/28B. All current counters (e.g., counters 28A) will become non-current, and all non-current counters (e.g., counters 28B) will become current. This operation forces a new generation of grace period processing. In particular, any readers 21 that perform counter manipulation after this point will operate on the newly designated current counters 28B. Their critical section operations will be protected because any callbacks that could possibly impact such critical section processing will be part of the new grace period. Processing of these callbacks will be deferred until the next counter flip. Only the callbacks associated with the old counters 28A will be ripe for processing, and this will not occur until these counters are safely decremented to zero by the readers 21. In step 78, the counter monitor 72 tests the non-current (old) counters 28A at each of the processors $4_1, 4_2 \ldots 4_n$, to ascertain whether they have been decremented to zero. Again, a zero value for all of the old counters 28A signifies that all readers 21 manipulating such counters will have completed their critical section read operations. At that point, the counter monitor 72 can unlock the global counter selector in step 82, and invoke the callback processor 26 to perform callback processing in step 84 on the callbacks that accumulated during the grace period associated with the old counters 28A. If the test in step 78 reveals that the old counters have not been zeroed, the counter monitor 72 spins and then returns to step 78 to retest the counters.

Figure 9A:
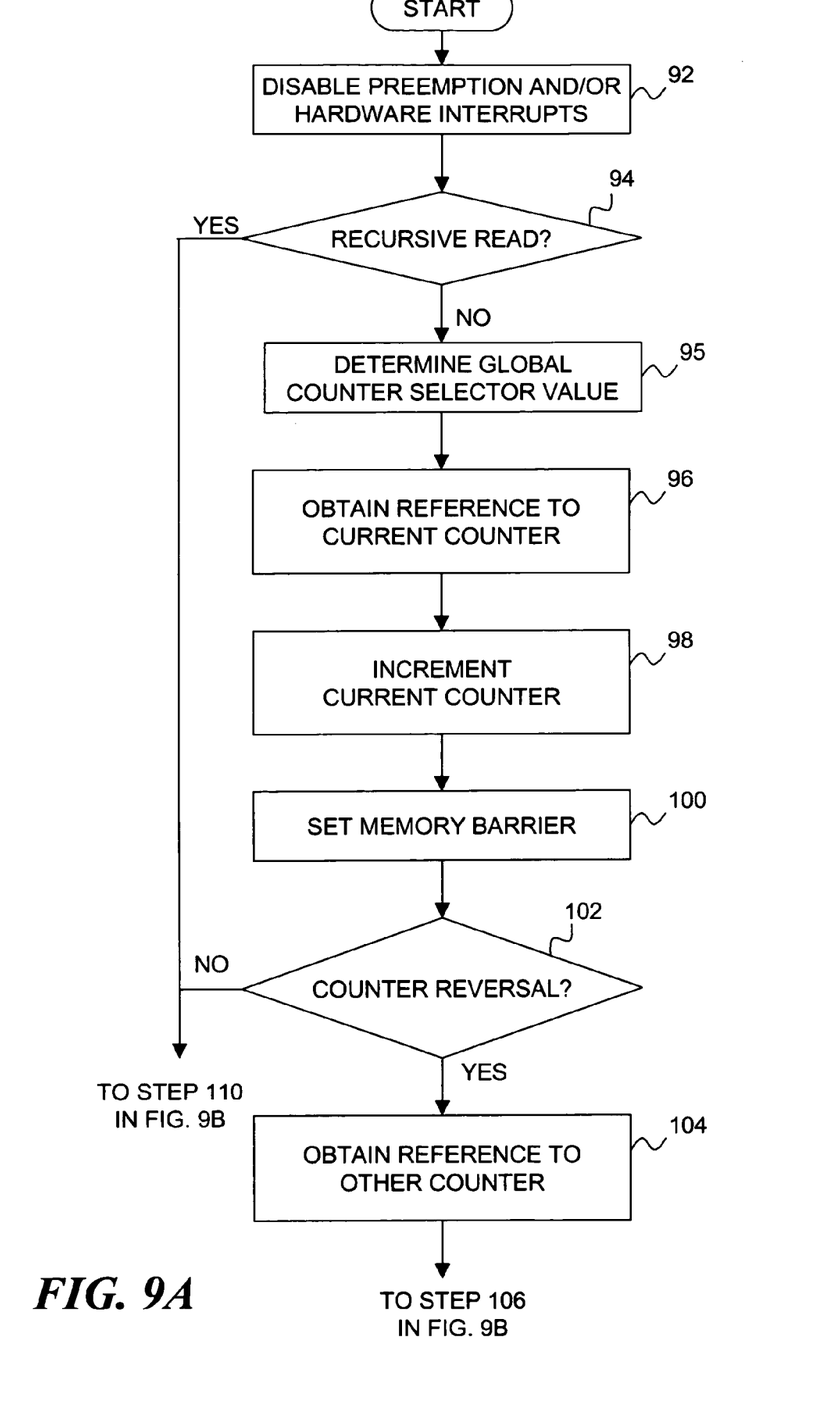
FIGS. 9A, 9B and 9C are parts of a flow diagram showing an alternative form of read processing that may be performed.
Figure 9B:
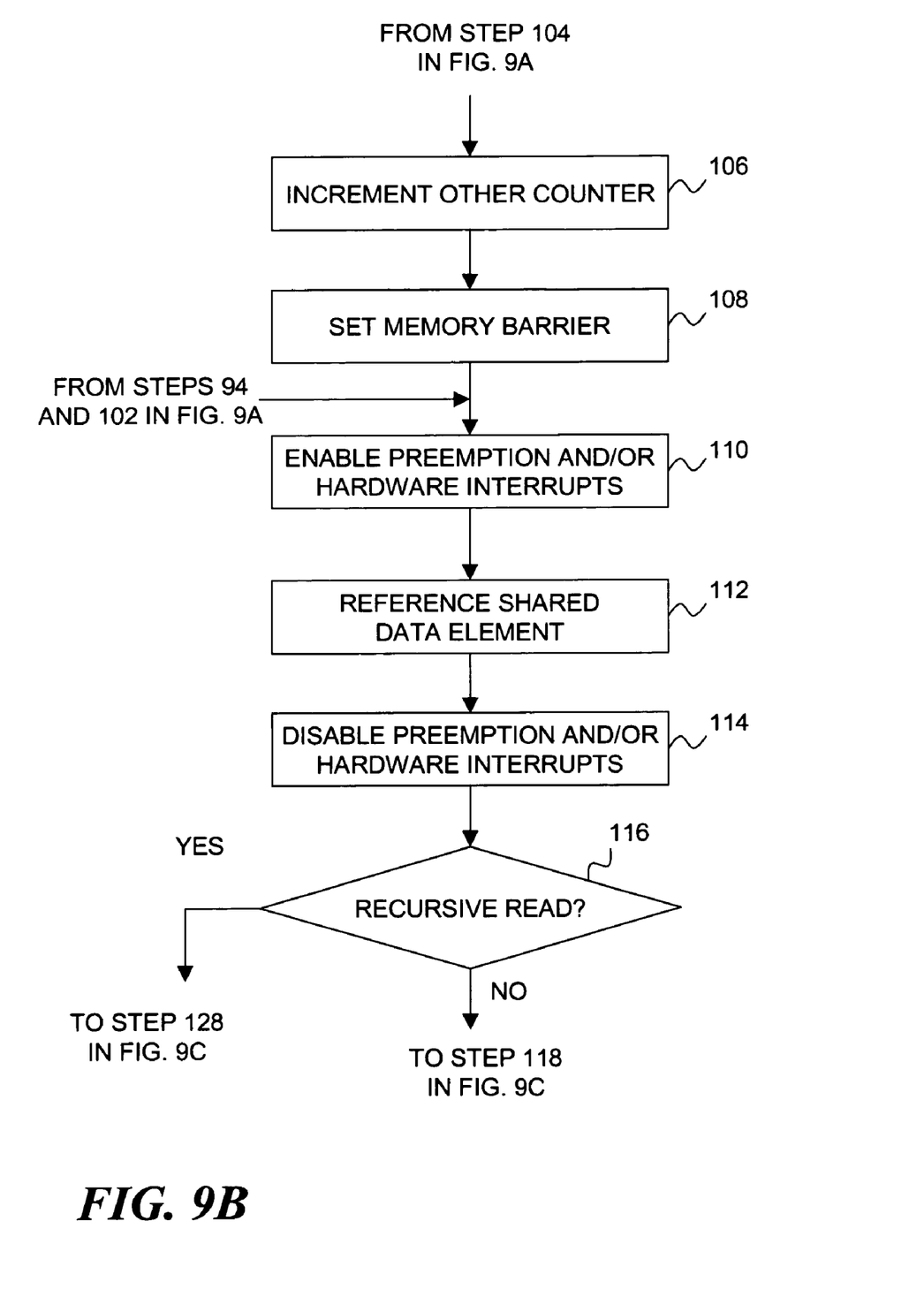
Figure 9C:
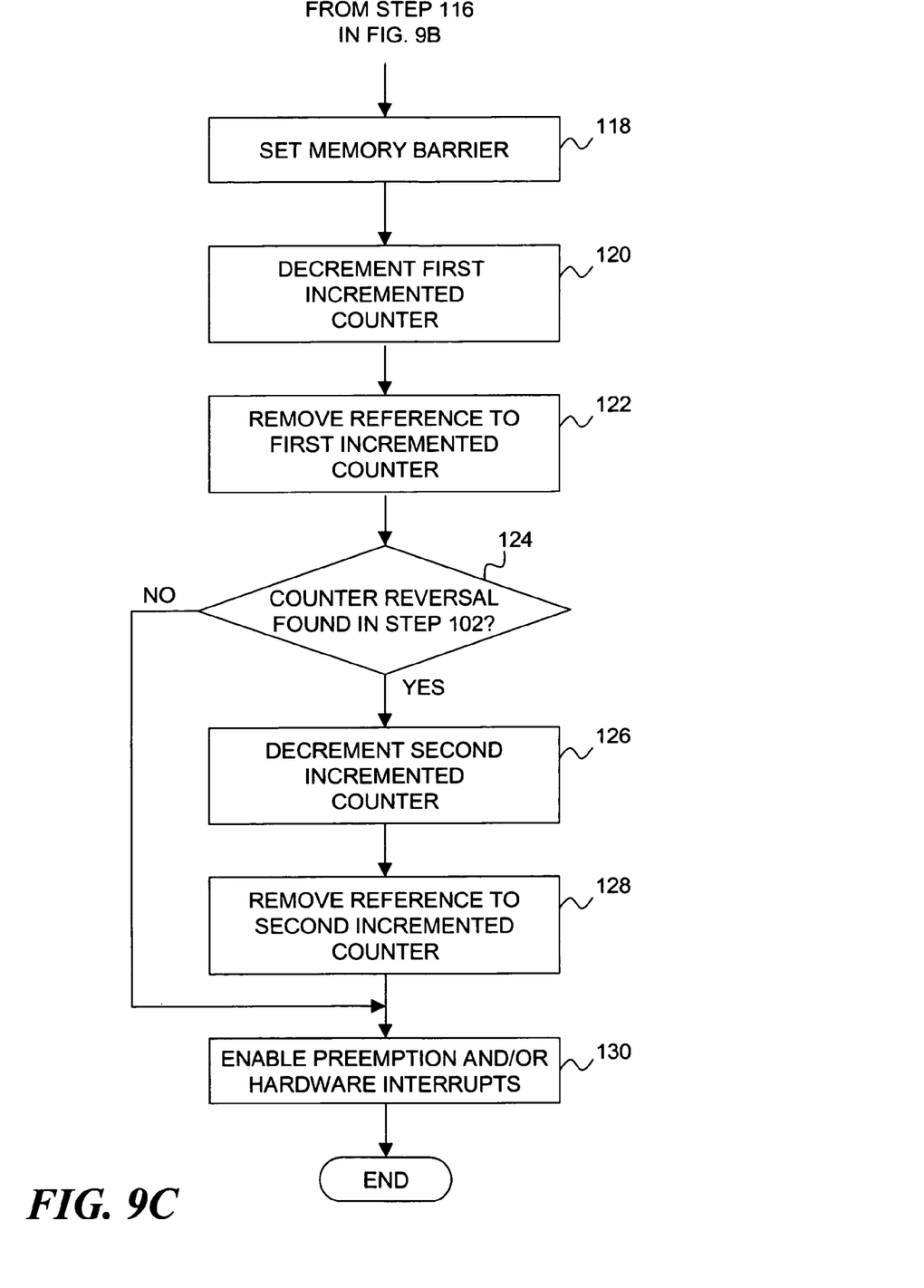

Turning now to FIGS. 9A-9C, an alternative implementation of the counter incrementer 32 and the counter decrementer 34 is illustrated in which both of the counters 28A and 28B are incremented in the event that a counter reversal race condition arises. The implementation of FIGS. 9A-9C avoids a potential livelock scenario associated with the implementation of FIGS. 7A-7B. According to this scenario, it is theoretically possible (although highly unlikely) that a counter reversal could occur on each pass through the loop that begins with step 52 in FIG. 7A, causing repetitive looping. The dual counter incrementation approach of FIGS. 9A-9B avoids this possibility.

The processing of FIG. 9A begins with the counter incrementer 32 disabling preemption and/or hardware interrupts in step 92. In step 94 a check is made whether the current read operation is recursive. If it is, control passes to step 110. If the current read operation is non-recursive, step 95 is performed. In this step, the value of the global counter selector 30 is determined, followed by a read memory barrier instruction. In step 96, the counter incrementer 32 obtains a reference to the current counter (e.g. 28A) of the counter pair 28 that is associated with the processor 4 on which the reader 21 is executing. In step 98, the counter incrementer 32 increments the current counter. The counter incrementer 32 executes a memory barrier instruction in step 100 to force completion of the counter incrementation. In step 102, the counter incrementer 32 tests for a counter reversal. If no reversal has occurred, control passes to step 110. If a counter reversal has occurred, such that the counter 28A incremented in step 98 is no longer current and the other counter 28B is now current, the counter incrementer 32 obtains a reference to this other counter in step 104 and increments it in step 106. The counter incrementer 32 executes a memory barrier instruction in step 108 to force completion of the counter incrementation. In step 110, the counter incrementer 32 re-enables preemption and/or hardware interrupts and control is returned to the reader 21.

When the counter incrementer 32 exists after step 110, there will be two pointer references in the reader's task structure that respectively point to the counters 28A/28B of the processor 4 that executed the reader 21. The reader 21 is free to reference the shared data in step 110, following which it calls the counter decrementer 36. In step 114, the counter decrementer 34 disables preemption and/or hardware interrupts. In step 116, the counter decrementer 34 tests if the current read operation is recursive. If it is, control passes to step 128. If the current read operation is non-recursive, the counter decrementer 36 executes a memory barrier instruction in step 118, then in step 120 decrements the first incremented counter 28A that was previously incremented in step 98. In step 122, the counter decrementer 36 removes the current reader's reference to the first incremented counter 28A. In step 124, the counter decrementer 36 tests whether a counter reversal was detected in step 102. If no reversal occurred, control passes to step 130. If a counter reversal was detected in step 102, the counter decrementer 36 implements step 126 and decrements the second incremented counter 34 that was previously incremented in step 106. In step 128, the counter decrementer 36 removes the current reader's reference to the counter 28B. In step 130, the counter decrementer 36 re-enables preemption and/or hardware interrupts, then returns control to the reader 21.

Figure 10:
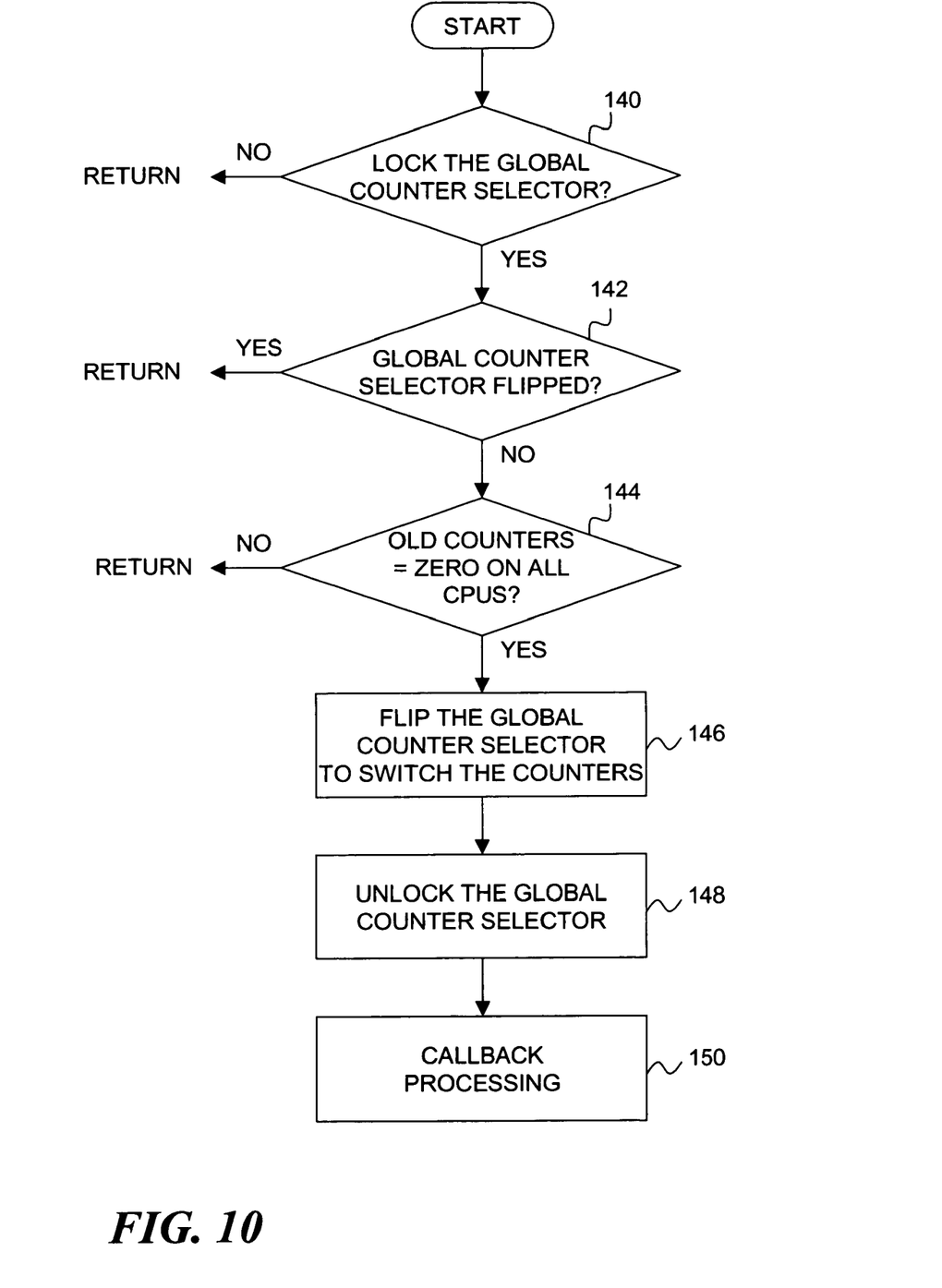
FIG. 10 is a flow diagram showing an alternative form of grace period detection processing that may be performed.

Turning now to FIG. 10, an alternative implementation of the grace period detection system 26 is shown in which the counter switch 70 operates somewhat differently than as shown in FIG. 8. Beginning in step 140, the counter switch 70 attempts to lock the global counter selector 30. If the lock cannot be acquired, processing terminates to defer grace period processing to the entity that successfully acquired the lock. If the counter switch 70 is successful in step 140, it tests in step 142 whether or not the global counter selector 30 has flipped. If the global counter selector 30 has flipped, then another entity has just performed grace period processing and the current grace processing invocation terminates. If the global counter selector 30 has not flipped in step 142, the counter monitor 72 tests (step 144) the non-current counter (old counter) at each of the processors $4_1, 4_2 \ldots 4_n$, to ascertain whether they have been decremented to zero. As described above, a zero value for all of the old counters signifies that all readers 21 manipulating such counters will have completed their read operations, and that callbacks accumulated during the grace period associated with that counter set may be processed. If the counters are not all zero in step 144, processing terminates relative to the current invocation of the grace period detection system 26 (to await the next invocation—typically by the OS scheduler). If the counters are determined to be zero in step 144, the counter switch 70 flips the global counter selector in step 146, then unlocks it in step 148. All current counters (e.g., counters 28A) will become non-current, and all non-current counters (e.g., counters 28B) will become current, thereby forcing a new generation of grace period processing. In step 150, the callback processor 26 is invoked to perform callback processing for the callbacks batched against the non-current (old) counters.

Figure 11:
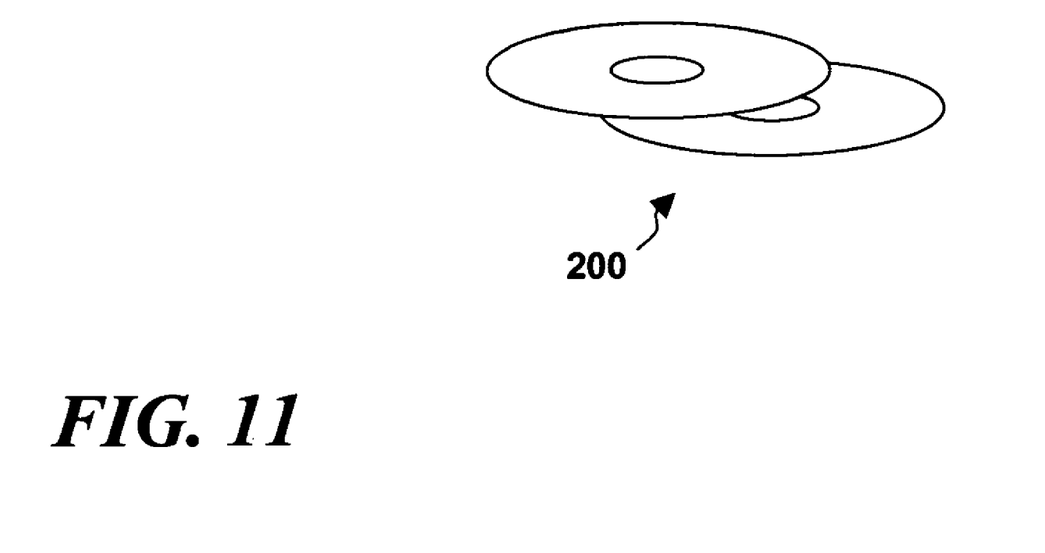
FIG. 11 is a diagrammatic illustration of media that can be used to provide a computer program product for implementing read-copy update processing in a realtime-safe manner in accordance with the invention.

Accordingly, a technique for realtime-safe read-copy update processing has been disclosed that allows readers to access shared data on a lock-free basis. It will be appreciated that the foregoing concepts may be variously embodied in any of a data processing system, a machine implemented method, and a computer program product in which programming means are provided by one or more machine-useable media for use in controlling a data processing system to perform the required functions. Exemplary machine-useable media for providing such programming means are shown by reference numeral 200 in FIG. 15. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming means for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for realtime-safe detection of a grace period for deferring the destruction of a shared data element until pre-existing references to the data element are removed, comprising:

establishing a pair of counters for each of one or more processors;

establishing a global counter selector that determines which counter of each per-processor counter pair is a current counter;

when reading a shared data element at a processor:

incrementing the current counter of said processor's counter pair that corresponds to said global counter selector;

testing for reversal of said processor's counter pair to ensure that the incremented counter is still the current counter corresponding to said global counter selector;

if a counter pair reversal has occurred such that said incremented counter has become the non-current counter, incrementing the other counter of said processor's counter pair that has become the current counter;

referencing said shared data element; and decrementing whichever counter of said processor's counter pair remains incremented;

updating said shared data element in a manner that preserves a pre-update version of said data element;

switching said global counter selector to establish a new current counter of each per-processor counter pair;

testing the non-current counter of each per-processor counter pair for zero; and destroying said shared data element's pre-update version upon the non-current counter of each per-processor counter pair being zero.

2. A method in accordance with claim 1 wherein said reading includes maintaining both counters of said processor's counter pair in an incremented state until referencing of said shared data element has completed in the event that a counter pair reversal has occurred.

3. A method in accordance with claim 1 wherein said reading includes decrementing said non-current counter prior to referencing said shared data element in the event that a counter pair reversal has occurred.

4. A method in accordance with claim 1 wherein no counter incrementation is performed in the event that said reading is a recursive read operation.

5. A method in accordance with claim 1 wherein said counters are implemented as per-processor data structures and said global counter selector is implemented as a Boolean value.

6. A method in accordance with claim 1 wherein said reading is performed by an executable task having an associated task structure, and wherein said task structure maintains a pointer to one or both counters of said processor's counter pair until said counter decrementation has occurred.

* * * * *